(12) United States Patent
Gould

(10) Patent No.: US 6,595,118 B1
(45) Date of Patent: Jul. 22, 2003

(54) TOASTER

(75) Inventor: Neil Gould, Hong Kong (HK)

(73) Assignee: Pro-duct SDA Manufacturers Ltd., Hong Kong (CN)

( * ) Notice: Subject to any disclaimer, the term of this patent is extended or adjusted under 35 U.S.C. 154(b) by 0 days.

(21) Appl. No.: 09/947,577

(22) Filed: Sep. 7, 2001

(30) Foreign Application Priority Data

Oct. 20, 2000 (EP) .............................................. 00122921

(51) Int. Cl.$^7$ ................................................ A47J 37/08

(52) U.S. Cl. ............................... 99/391; 99/389; 99/385

(58) Field of Search ........................... 99/385, 389, 391, 99/386, 387, 388, 390, 392, 393, 395, 401, 402

(56) References Cited

U.S. PATENT DOCUMENTS

| | | | | |
|---|---|---|---|---|
| 1,624,893 A | * | 4/1927 | Marsden | 99/291 |
| 2,465,577 A | * | 3/1949 | Cox | 99/291 |
| 3,800,691 A | * | 4/1974 | Eaton, Jr. et al. | 99/391 |

* cited by examiner

*Primary Examiner*—Reginald L. Alexander
(74) *Attorney, Agent, or Firm*—Lawrence E. Laubscher

(57) ABSTRACT

The present invention relates to a toaster having a housing (11) that is provided with one or more slots (14) each for accommodating one or more slices of bread for making toast. To improve the handling of the toaster while making toast and to simplify keeping it warm, the housing (11) is provided with a compartment (20) for accommodating a slidably mounted drawer (21) onto which a collapsible toast rack device (26) is mounted. When the toast rack device is in the collapsed condition, the drawer is adapted to be pulled out of and pushed into said housing (11).

8 Claims, 2 Drawing Sheets

TOASTER

FIELD OF THE INVENTION

The present invention relates to a toaster having a housing provided with one or more toasting openings each for accommodating one or more slices of bread for making toast, characterized in that the housing is provided with a toast rack compartment for accommodating a tray that is slidably displaceable between extended and retracted positions relative to said toaster housing, collapsible toast rack means being mounted on said tray for storing toast that is prepared by said toaster.

BACKGROUND OF THE INVENTION

Brief Description of the Related Art

Toasters are well known in the art and are used by many people for a long time for making toast, i.e., for making sliced bread brown and crisp by exposing it to direct heat. Usually such toasters are adapted to make two or four pieces of toast at the same time. If more then two or four pieces of toast have to be made, the pieces of toast have to be stored in a place where the toast stays warm.

Since the toast stays warmer when it is in a vertical position then in a position lying flat—face up or face down on a plate or in a bread-basket—toast racks are often used for holding warm toast in a vertical position.

Toast racks which are also well known in the art usually consists of two rods or bars arranged in parallel with each other and connected to each other by a plurality of bows made of wire which are arranged in parallel to each other and substantially perpendicular to the rods so as to form a plurality of spaces for accommodating slices of bread.

Although such toast racks are suitable for holding slices of bread, in particular toasted slices of bread, such a toast rack needs a lot of space beside the toaster even if it is not needed.

SUMMARY OF THE INVENTION

The object underlying the present invention is to provide a new toaster which simplifies making toast and keeping toast warm.

According to the present invention the toaster housing is provided with a compartment for accommodating a drawer or tray that is adapted to be pulled out of and pushed into said housing, collapsible toast rack means being carried by the tray. Thus, the toast rack is an integral part of the toaster so that a separate toast rack is not required when making toast, since the toast rack can be easily pulled out from its storage position within the compartment of the housing into its operating position outside the housing. Therefore, the toast rack is always available when making toast with a toaster according to the present invention.

To simplify handling, the toast rack means includes a plurality of generally U-shaped rack members formed of rods or wires, wherein said rack members are effectively joined together so that said rack members are movable in synchronism with each other, said rack members being joined by means of a wire.

Due to this embodiment it is very easy for the user to bring the toast rack means into its operating position, since the user only needs to pull the drawer out of the housing and to lift up by hand only one of the rack members from its lying down position into its upright position, whereby the other rack members follow this movement.

According to a suitable refinement of the present invention, said rack members are biased into their upright positions by spring means, so that said rack members are automatically moved into their upright positions when said drawer is pulled out of said housing.

To ensure that the rack members will stay in their upright positions when the toast rack is needed, said rack members are releasably locked in their upright positions.

To reduce the space needed for the toast rack within the housing of the toaster, the rack members are of graduated size, so that they fit into each other in a nested relation when they are folded into their lying down position. Due to this feature all the nested rack members can be arranged in a single plane.

Therefore, the drawer carrying the toast rack means can be made very flat and does not increase the height of the toaster significantly.

According to another refinement of the present invention, the compartment for accommodating the toast rack drawer is provided in a base of said housing, whereby said toast rack means fits into the housing at the bottom thereof.

According to a preferred embodiment of the present invention, the toast rack drawer comprises a sliding drawer tray preferably made of metal onto which said rack members are mounted, and a drawer cover is provided that is preferably made of a synthetic plastic material. This arrangement improves not only the construction of the toast rack means, but also the ability of preventing toast from being cooled by circulating air. In particular, the sliding drawer tray preferably is made of metal and is arranged beneath the spaces, thereby accommodating toasted slices of bread and preventing or hindering air from circulating along the toasted bread due to heat convection.

BRIEF DESCRIPTION OF THE DRAWINGS

Referring now to the accompanying drawings, the present invention will be described by way of example in more detail with regard to a preferred embodiment.

The same reference signs are use for similar elements throughout the drawings.

DETAILED DESCRIPTION

Figure 1:
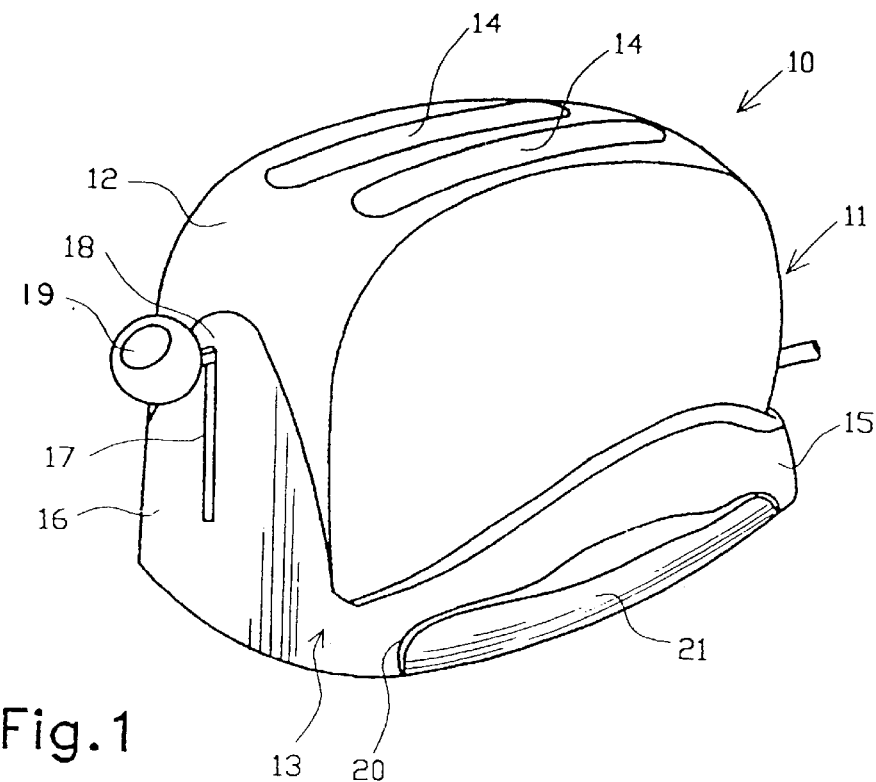
FIG. 1 is a front perspective view of a toaster according to the present invention.

Referring to FIG. 1, the toaster 10 comprises a housing 11 having an upper hood-like portion 12 and a base portion 13. The upper side of the upper portion 12 is provided with two slots 14 each for accommodating one slice of bread for making toast. Depending on the specific type of toaster, the slots 14 can be also adapted for accommodating two or even more slices of bread. In addition, it is also possible to provide only one slot 14 or more than two slots. The base portion 13 comprises a base 15 and a side wall 16 provided with an operating slit 17. An operating lever 18 provided with a knob 19 for operating the toaster, said lever extending from the inside of the housing 11 through the operating slit 17 to the outside.

The base 15 is provided with a compartment 20 accommodating a drawer or tray 21 which can be pulled out of and pushed into the base 15 of the housing 11.

Figure 2:
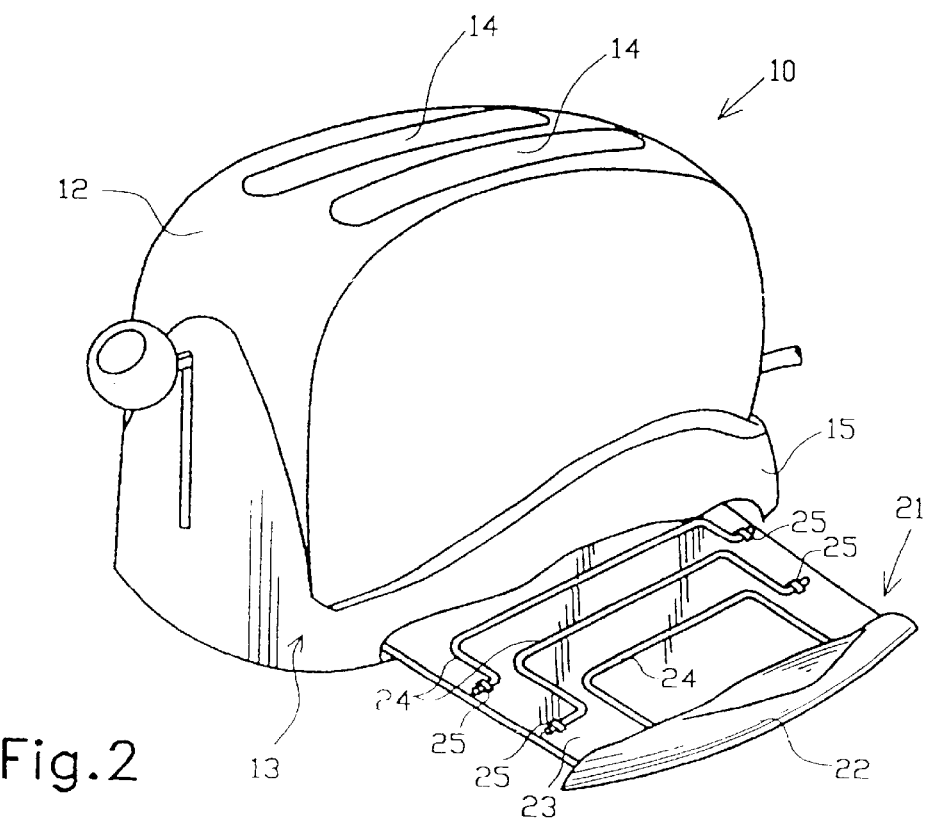
FIG. 2 is a front perspective view of the toaster according to the present invention, wherein the sliding drawer tray is pulled out of the toaster housing while the toast rack means is in its collapsed horizontal position.
Figure 3:
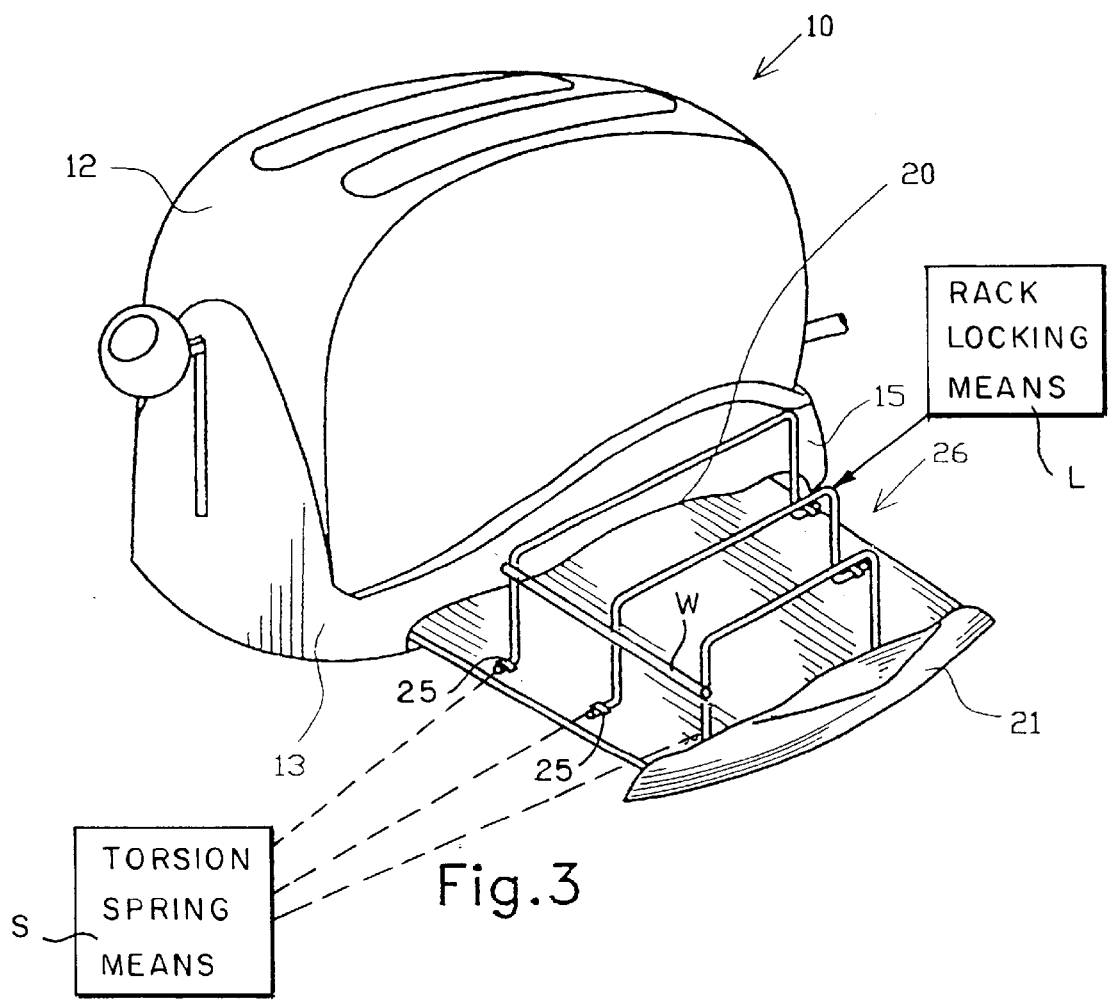
FIG. 3 is a front perspective view of the toaster according to the present invention, wherein the sliding drawer tray is in its pulled out position while the toast rack means is in its upright position.
Figure 4:
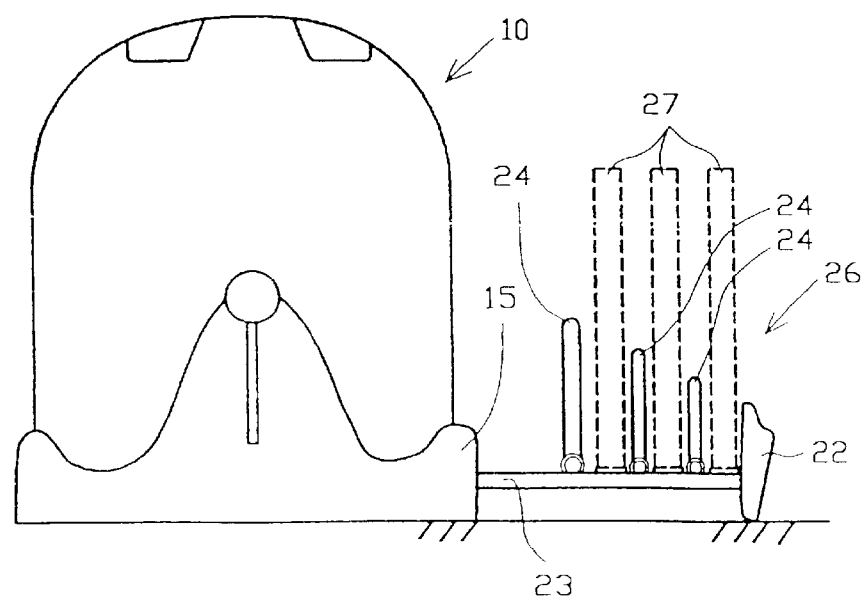
FIG. 4 is a view of the toaster according to the present invention, wherein the sliding drawer tray and the toast rack are in the same position as in FIG. 3.

Referring now to FIG. 2 which shows the toaster according to the present invention with the drawer 21 pulled out of the base 15. The drawer includes a drawer cover 22 and a sliding drawer tray 23. A number of inverted U-shaped rack members (24) formed of a rod or wire are mounted on the sliding drawer tray 23 by hinges 25, whereby the wire racks 24 can be swiveled up when the drawer 21 is pulled out of the base 15 of the toaster 10 to form toast rack means 26 as shown in FIGS. 3 and 4. The hinges 25, which are shown schematically in the drawings, can be of any suitable kind allowing each of the rack members 24 to be swiveled up from its horizontal position shown in FIG. 2 into its upright position shown in FIG. 3.

The dimensions of each rack is determined with regard to the other racks 24 so that each rack 24 fits into the other so that all racks 24 are lying in one plane and being in contact with the upper side of the sliding drawer tray 23. Thus, the thickness of the sliding drawer tray 23 with the racks 24 folded into horizontal position can be made small so that the compartment 20 for accommodating the drawer 22 only needs to have a relative small height. Therefore, the height of the toaster 10 will not be influenced significantly by the toast rack means 26 integrated into the base 15 of the toaster 10.

Although in the drawings only three racks 24 are shown for forming the toast rack it is also possible to provide more than three racks 24. The more racks are provided the more toast can be held.

According to a first embodiment of the present invention each wire rack 24 must be manually lifted up into its upright position. However, according to a preferred embodiment of the present invention the racks 24 are joined to each other in such a way that the racks 24 will all stand up together when a user manually pulls up one of the racks 24 by hand. For this purpose it is possible to join all the racks 24 by a connecting wire W.

According to another embodiment of the present invention it is possible to provide a spring means for biasing the rack members 24 into their upright positions. In this case the racks 24 will be lifted up by means of the spring either immediately after pulling out the drawer 21 or after releasing a locking means L provided for holding each of the racks 24 into its horizontal position against the biasing force of the spring means. It is possible to provide a torsion spring S for biasing the racks 24 into the upright position and to integrate one or more torsion springs into one or more of the hinges 25.

After the drawer 21 has been pulled out of the base 15, and after lifting up the racks 24 for forming the toast rack means 26, this toast rack means 26 is arranged just beside the toaster 10. The drawer cover 22, which is preferably made of a synthetic plastic material and which serves as handle for pulling out the drawer 21 is supported on the same surface as the toaster 10 (as shown in FIG. 4). Thus, the toast rack means 26 formed by the sliding drawer tray 23 which is preferably made of metal and by the racks 24 is reliably supported on the housing side by sliding means (not shown) provided within the compartment 20 in the base 15 and on the other side by the drawer cover 22.

During toasting bread the user can keep two pieces of toast in the toast rack 26 while toasting another two slices of bread in the toaster. According to FIG. 4, three pieces of toast 27 are kept in the toast rack 26 between the rack members 24. One of these pieces of toast 27 is held between the drawer cover 22 and the adjacent rack 24.

Upon finishing making toast, the user only needs to fold the racks 24 into their horizontal positions and to push the drawer 21 into the base 15. Thus, the toast rack means is stored within the toaster 10 and needs no further space for storage in the kitchen.

What is claimed is:

1. A toaster for toasting bread, comprising:
   (a) a housing (11) having a pair of opposed vertical side walls, a pair of opposed vertical end walls, and horizontal top and bottom walls, said housing containing at least one toasting opening (14) for receiving a slice of bread to be toasted, one of said side and end walls containing a toast rack compartment (20);
   (b) a horizontal tray (23) slidably mounted in said compartment for displacement between extended and retracted positions relative to said housing; and
   (c) toast rack means (26) mounted on said tray, including a plurality of parallel generally U-shaped inverted rack members (24) each hingedly connected with the upper surface of said tray for displacement between horizontal and vertical positions relative to said tray, said rack members in their vertical positions being parallel and spaced to define slots for receiving slices of toast to be stored.

2. The toaster as claimed in claim 1, and further including means for joining said rack members (24) for movement in synchronism with each other.

3. The toaster as claimed in claim 2, wherein said rack member joining means comprises a wire.

4. The toaster as claimed in claim 1, and further including spring means for biasing said rack members toward their upward position, whereby said rack members (24) are automatically moved into their vertical positions when said tray is displaced from said retracted position toward said extended position relative to said housing (11).

5. The toaster as claimed in claim 1, and further including locking means for locking said rack members in their vertical positions.

6. The toaster as claimed in claim 1, wherein said rack members (24) are graduated in size so that they fit into each other in nested relation when they are folded downwardly into their horizontal positions.

7. The toaster as claimed in claim 1, wherein said housing has a base portion (15) containing said compartment, whereby said toast rack means is arranged adjacent the bottom of said housing.

8. The toaster as claimed in claim 1, wherein said tray is formed of metal, and further including a cover member (22) supporting one end of said tray when said tray is in said extended position, said cover member being formed from a synthetic plastic material.

* * * * *